Oct. 20, 1959     A. H. STANLEY     2,909,590
INSULATOR BRACKET
Filed April 3, 1958     2 Sheets-Sheet 1
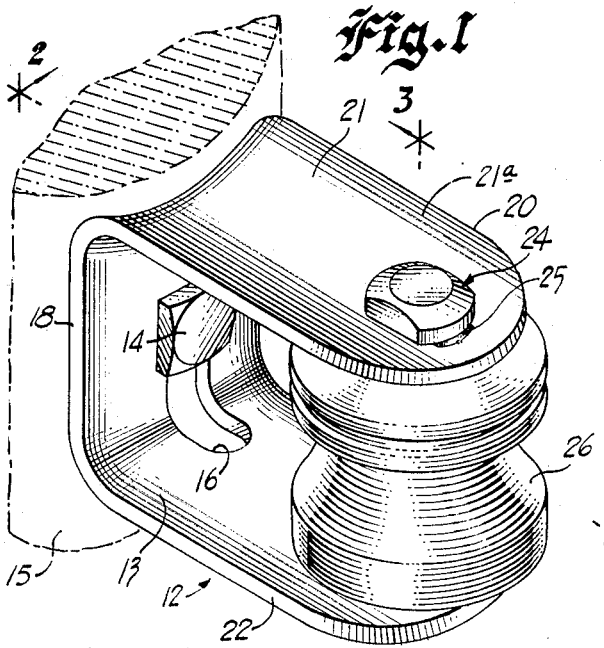
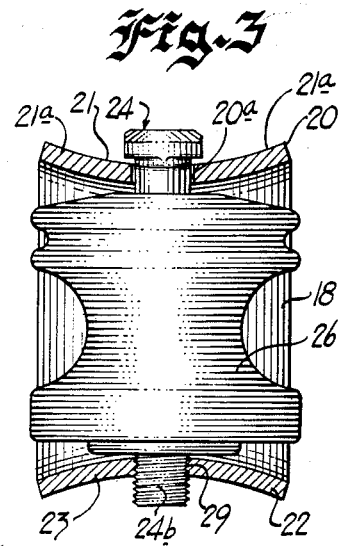
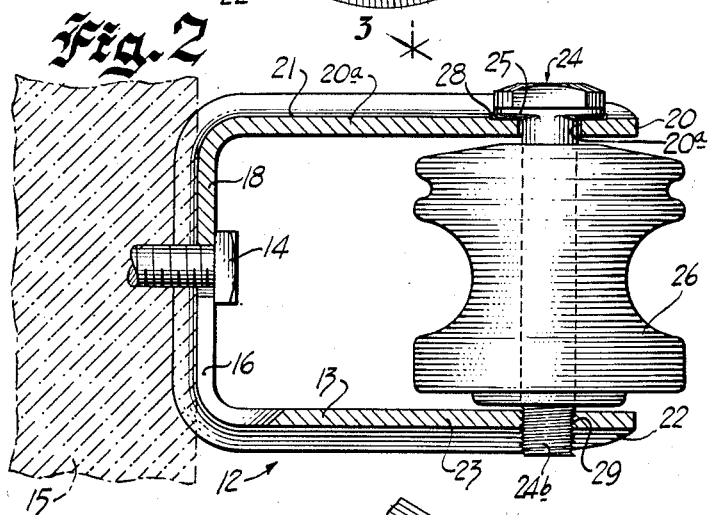
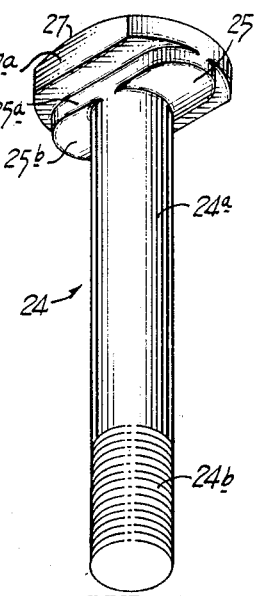
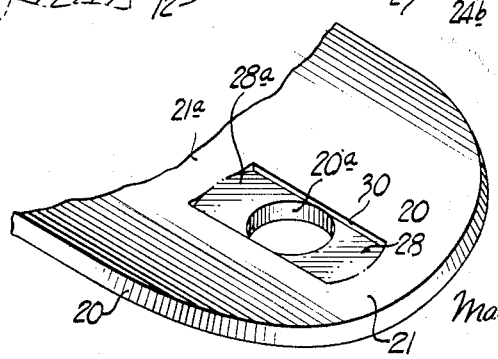
INVENTOR.
Alfred H. Stanley
BY Mason, Kolehmainen, Rathburn & Wyss.
Attorneys.

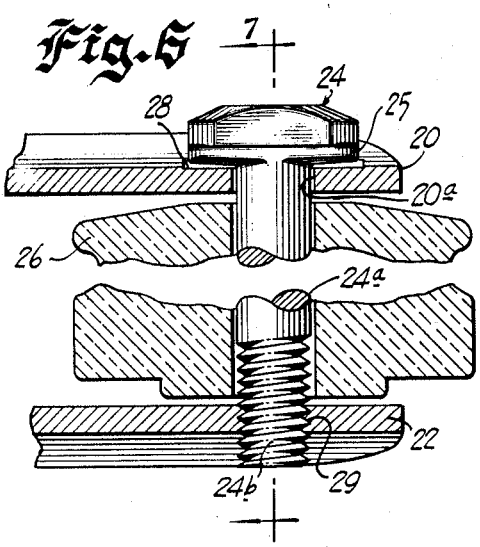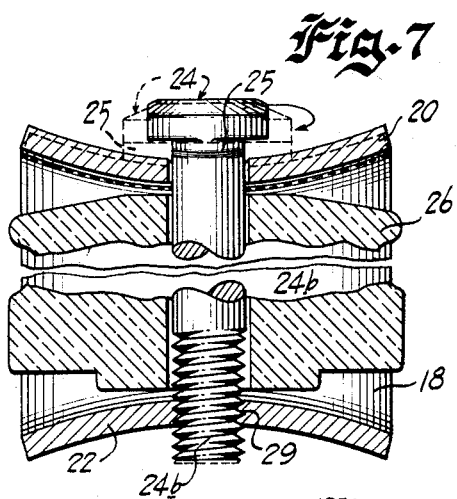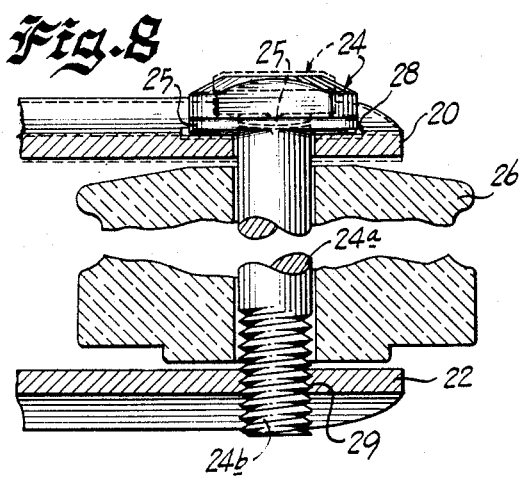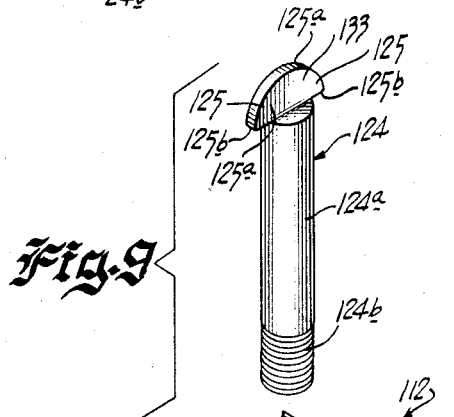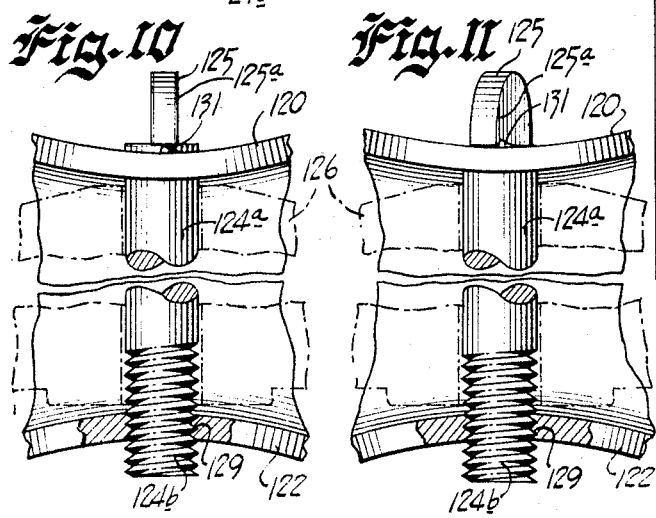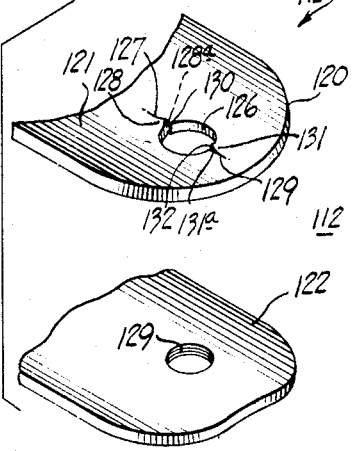

United States Patent Office 2,909,590
Patented Oct. 20, 1959

2,909,590
INSULATOR BRACKET

Alfred H. Stanley, Hinsdale, Ill., assignor to Joslyn Mfg. and Supply Co., Chicago, Ill., a corporation of Illinois Application April 3, 1958, Serial No. 726,171

8 Claims. (Cl. 174—162)

The present invention relates to an insulator bracket, and, more particularly, to an insulator bracket for use in secondary distribution circuits of electric power systems. Specifically, the present invention is an improvement over the insulator bracket disclosed and claimed in the patent to Burton Smalley No. 2,740,827, assigned to the same assignee as the present application.

In electric power distribution systems it is customary to support line wires on so-called secondary brackets or racks which are supported from distribution poles. These brackets include a clevis or similar device on which is mounted an insulated spool adapted to engage and support a line wire. In some prior art brackets the spool is rotatably mounted on a support bolt which is secured to the bracket by a cotter pin. When a lineman is stringing a line wire between brackets of this type, it is necessary that the cotter pin, support bolt and insulated spool be removed, the line wire placed into the clevis, and thereafter the support bolt, insulated spool and cotter pin be reassembled. It has been observed that at an elevated location on a pole it is extremely difficult and awkward for the lineman to handle a small cotter pin. Accordingly, it would be desirable to eliminate difficult-to-handle bolt components which delay and complicate the assembly and disassembly of the insulator bracket.

Therefore, it is an object of the present invention to provide an insulator bracket which is easily and rapidly disassembled and assembled during the stringing of a line wire.

Another object of the present invention is to provide an insulator bracket in which a spool is supported from a clevis solely by the use of a mounting bolt.

A further object of the present invention is to provide an insulator bracket including a spool rotatably supported in such manner that it will not be inadvertently separated from the clevis by rotation of the spool as might be caused, for example, by passing the line wire over the spool.

It is yet another object of the present invention to provide an insulator bracket including a clevis and bolt structure which provides for ready assembly of the spool merely by manipulating the spool supporting bolt and, at the same time, prevents inadvertent disassembly of the spool from its support bolt during normal use.

Briefly, in accordance with the present invention, there is provided an insulator bracket including a clevis adapted to be secured to a pole or the like structure. The clevis includes a pole engaging center section carrying upper and lower spaced apart, somewhat resilient arms which embrace an insulated, line wire engaging spool. The spool is rotatably mounted on a mounting bolt which extends through an oversized opening in the upper clevis arm into engagement with a tapped opening in the lower clevis arm. Adjacent to the oversized opening, the upper clevis arm is provided with a restraining means for engaging a detent defined on the head of the bolt, thereby to hold the bolt against rotation when the line wire passes over the spool and, hence, to prevent disassembly of the bracket. In order to assemble the bracket assembly, the bolt is manually turned until the detent engages portions of the upper clevis arm so that continued rotation of the bolt produces a camming action resulting in relative movement of the clevis arms toward one another. When the detent is aligned with the restraining means the inherent resilience of the clevis arms causes these arms to move away from one another in order to seat the restraining means against the bolt detent and prevent further rotation of the bolt. By this construction, rotation of the bolt is prevened despite rotation of the spool during the stringing of a line wire and, as a result, the insulator bracket is retained in assembled relation during normal use.

The invention both as to organization and method of operation, together with further objects and advantages thereof, will best be understood by reference to the following description taken in connection with the accompanying drawings, in which:

Fig. 1 is a perspective view of one embodiment of an insulator bracket employing the features of the present invention;

Fig. 2 is a sectional view taken along a line substantially corresponding to line 2—2 of Fig. 1;

Fig. 3 is a sectional view taken along a line substantially corresponding to line 3—3 of Fig. 1;

Fig. 4 is an enlarged perspective view of a mounting bolt which may be employed in the bracket of Fig. 1;

Fig. 5 is an enlarged fragmentary perspective view of the upper clevis arm of the bracket shown in Fig. 1 showing particularly the bolt restraining means;

Fig. 6 is a fragmentary elevational view shown partially in section illustrating the mounting bolt and the clevis arms in partially assembled relation;

Fig. 7 is a sectional view taken along a line substantially corresponding to line 7—7 of Fig. 6 illustrating the position of the clevis arms when the mounting bolt has been rotated 90 degrees from the position shown in Fig. 6;

Fig. 8 is a fragmentary elevational view illustrating the position of the clevis arms after the mounting bolt has been rotated 180 degrees from the position shown in Fig. 6 so that the bolt is in its locking position;

Fig. 9 is a fragmentary, exploded perspective view of a modified construction of the insulator bracket of the present invention;

Fig. 10 is a fragmentary sectional view of the bracket shown in Fig. 9 shown with the insulator spool in phantom and with the bolt assembled on the bracket to illustrate the position of the clevis arms when the mounting bolt is in engagement with the upraised projections defined in the upper clevis arm; and Fig. 11 is a fragmentary sectional view similar to Fig. 10 but illustrating the position of the clevis arms when the mounting bolt is in its locking position.

Referring now to the drawings, one embodiment of the present invention is illustrated in Figs. 1 through 8 while a second embodiment of the invention is shown in Figs. 9 through 11. Considering first the embodiment illustrated in Figs. 1 through 8, there is shown an insulator bracket 12 including a clevis 13 secured by a bolt 14 to a pole or similar support 15. The bolt 14 extends through a slot 16 having a construction and performing a function identical to the corresponding slot defined in the clevis disclosed in the above identified Smalley Patent No. 2,740,827. The clevis includes a central web 18 interconnecting a pair of spaced, generally parallel, upper and lower clevis arms 20 and 22 respectively. As illustrated in the drawings, the web 18 may be curved to conform to the surface of a cylindrical pole or brace although, if supports of other contour are used, the shape of web 18 may obviously vary accordingly. The ends of the clevis arms 20 and 22 support a mounting bolt 24 which includes an elongated detent 25 adapted to cooperate with a bolt restraining means or recess 28 defined in the upper clevis arm 20 for the purpose of preventing rotation of the bolt relative to the clevis as described more fully hereinafter. The mounting bolt 24 rotatably mounts an insulating spool 26 for supporting a transmission line or the like in conventional manner.

The clevis 13 is stamped into its generally U-shaped configuration from a bar of material having a moderately elastic property, e.g., low carbon steel, such that the clevis arms 20 and 22 may be moved toward one another during rotation of the bolt 24 and assembly of the bracket 12, as described in greater detail hereinafter. Once the elastic arms have been moved toward one another the somewhat resilient clevis arms develop a force which urges the arms to return to their original undeflected position.

During the stamping operation the upper and lower clevis arms 20 and 22 are respectively concaved or bowed upwardly and downwardly thereby to provide depressions or channels 21 and 23 extending longitudinally of the arms 20 and 22. The bottom of the channel 21 lies along the longitudinal center line of the clevis arm 20 while the progressively elevated sides 21a of the channel 21 extend laterally from the center line. An oversized opening 20a defined adjacent the outwardly extending end of the upper clevis arm 20 loosely receives the stem 24a of the mounting bolt 24. The lower clevis arm 22 has defined adjacent its outwardly extending end a tapped aperture 29 for threadedly receiving the threaded end 24b of the stem of the mounting bolt 24. Thus, the mounting bolt passes through a central opening in the spool 26 and has its lower end threaded into the aperture 29 of the lower clevis arm 22.

As is best shown in Fig. 5 of the drawings, the bolt restraining means or the recess 28 has a generally rectangular bottom 28a which is flatter than the curved bottom of the channel 21 in the arm 20. The width of the bottom 28a is approximately equal to the diameter of the opening 20a and the recess 28 extends along the center line of the channel equal distances and from opposite sides of the opening 20a. Longitudinal sides 30 of the recess 28 are inclined relative to the bottom 28a to diverge upwardly and outwardly. It will be appreciated that the recess 28 preferably is formed in the arm 20 by a separate stamping operation performed after the clevis has been shaped.

As is best shown in Fig. 4, the mounting bolt 24 is of T-shaped configuration and includes a head 27 disposed at one end of the stem 24a. The head 27 is preferably provided with a pair of opposing flat surfaces 27a, which surfaces 27a are adapted to be gripped by a wrench in order to thread the lower end 24b of the bolt 24 into the tapped opening 29 of the lower clevis arm 22. It should be noted that while the threads 24b may be cut into the stem of the bolt, it is preferable to roll the threads since the rolled thread is stronger. As is clearly illustrated in Fig. 4, the elongated detent 25 is an integral part of the bolt and depends from the under surface of the head 27. It is symmetrically located on opposite sides of the stem 24a and has a somewhat rectangular shape which is generally conformable to the recess 28. Specifically, the detent 25 has a width substantially equal to the diameter of the stem 24a and a length equal to the length of the head 27. The detent includes a wall 25a having a pair of flat lengthwise portions interconnected by a pair of curved end portions and further includes a curved bottom 25b which permits the elongated detent to ride over the inclined sides 30 of the recess 28 onto the channel 21, thereby permitting the detent to be unseated from the recess.

To install the insulator bracket 12, the clevis 13 is first secured to the pole 15 by passing bolt 14 through the elongated slot 16. The bore of the insulator spool 26 is next aligned with the openings 20a and 29 and the mounting bolt 24 is then inserted through the aligned openings and into threaded engagement with the opening 29 in the lower clevis arm 22. The stem 24a of the bolt 24 is of such length that the head 27 is spaced from the upper clevis arm 20 during the first few turns of the bolt into the aperture 29. After several turns of the bolt 24, the under surface 25b of the elongated detent 25 engages the sides 21a of the channel 21 in the upper clevis arm 20. When the bolt 24 is turned further the arms 20 and 22 are moved or deflected toward one another as the detent 25 presses against the elevated sides 21a due to the inherent resiliency or elasticity of the clevis arms. The resilient force developed in the clevis arms thereafter acts to urge the arms to return to their original or undeflected position. Whenever the elongated detent is moved to a position where it is aligned above the recess 28, the described force tends to move the clevis arms toward one another as viewed in Figs. 1, 2 and 3 so that the detent 25 enters the recess 28. During each revolution thereafter, the clevis arms will be deflected toward one another twice and the arms will be urged back into their originally undeflected position twice, while the bolt is advanced into the threaded opening by an amount equal to the pitch of the threads on the end 24b. After several such revolutions the bolt is stopped at a position where the elongated detent is snugly seated in the recess 28 of the upper clevis arm 20 at which time the elastic force of the clevis arms 20 and 22 prevents the unseating of the detent from the recess, thereby preventing movement or rotation of the mounting bolt 24 relative to the clevis despite rotation of the insulator spool when the line wire is strung.

The positions of the clevis arms 20 and 22 during a half rotation of the mounting bolt 24 are illustrated in Figs. 6, 7 and 8. In Fig. 6 the elongated detent 25 is shown aligned with and loosely seated in the recess 28. When the bolt is rotated from the position shown in Fig. 6 in a clockwise direction, as viewed from the top of Figs. 6, 7 and 8, the curved undersurface 25b of the elongated detent 25 slides over the inclined sides 30 and out of the recess 28 onto the progressively elevated sides 21a of the channel 21, with the result that the clevis arms 20 and 22 are deflected toward one another. The continued rotation of the bolt progressively increases the deflection of the arms 20 and 22 toward one another as the undersurface 25b rides further up the elevated sides 21a of the channel 21. When the mounting bolt 24 is rotated 90 degrees from the position indicated in Fig. 6 to the position indicated in dotted lines in Fig. 7, the clevis arms 20 and 22 assume positions of maximum deflection for the half rotation.

Rotation of the mounting bolt 24 through an additional 90 degrees, i.e., from the position indicated in dotted lines in Fig. 7 to the position indicated in solid lines in Fig. 8, again brings the elongated detent 25 into alignment with the recess 28. Specifically, as the bolt is turned from the position shown in dotted lines in Fig. 7 the ends of the detent 25 move off the maximum elevated points on the channel sides 21a and move over progressively less elevated portions of the channel sides thereby permitting the clevis arms 20 and 22 to be moved away from each other under the action of the resilient force. The bolt 24 thus moves from the position indicated in dotted lines in Fig. 8 to the position indicated in solid lines. In this latter position the detent 25 is again aligned with the recess 28 and, as a result, the clevis arms tend to return to their original positions shown in Fig. 6. However, since the mounting bolt is rotated one-half turn and the lower end 24b of the stem is advanced into the tapped opening 29, the head 27 and the elongated detent 25 are moved from the position shown in Fig. 6 so that they are closer to the lower clevis arm 22 by a distance equal to one half the pitch of the threads of the end 24b. Hence, as a result of the advancement of the bolt into the tapped opening 29, the detent 25 no longer loosely seats in the recess 28 but is instead snugly seated in this recess. The change in the relative position of the head and lower clevis arm for a 90 degree rotation of the bolt is, of course, indicated in Figs. 7 and 8 by the solid line and dotted line illustrations of the bolt head.

Further rotation of the mounting bolt is effected to seat the detent 25 more snugly in the recess 28 until a seating position is eventually reached where the clevis arms are just slightly deflected when the detent is seated. In this position, a small resilient force is developed to retain the detent and recess in mated engagement and, hence, to prevent relative rotation of the bolt and clevis arms. It should be observed that even if a rotative force is applied to the bolt of sufficient force to unseat the detent from the recess, the detent rides up the increasingly elevated depression sides 21a to cause progressively greater deflection of the clevis arms with the attendant development of a progressively greater force resisting the tendency of the bolt to turn. Hence, during conventional usage of the insulator bracket it is very unlikely that the bolt 24 will be rotated as, for example, by passage of wire over the spool, by a sufficient amount to cause the bolt to be threaded out of the opening 29.

It should be observed that it is not desirable, for several reasons, to have the clevis arms 20 and 22 deflected a substantial amount when the insulator bracket is in assembled condition. First, when a lineman is attempting to disassemble the bracket 12 for repair or replacement of defective parts, he might be unable to apply to the bolt a force adequate to overcome the resilient force developed by the clevis arms. Secondly, it is necessary that spacing be maintained between the insulator spool 26 and the upper and lower clevis arms in order to permit free rotation of the spool during the stringing of a line. If the arms are deflected too much they will either obstruct the desired rotative action of the spool or will compress the spool during assembly or disassembly with the attendant possibility of cracking or breaking the insulator spool.

In order to disassemble the insulator bracket it is only necessary that the bolt be rotated in a counterclockwise direction, as viewed from the top of Figs. 6, 7 and 8, thereby to withdraw the threaded end 24b from the opening 29. It is evident that there must be applied a counterclockwise force to the bolt of such magnitude as to overcome the progressively increasing elastic force caused by moving the detent over the elevated sides. Such a force is, of course, produced by using a wrench in engagement with sides 27a of the bolt head. In view of the foregoing description, it will be recognized that a single wrench is the only tool required to assemble and disassemble the bracket.

Considering now the embodiment of the invention illustrated in Figs. 9 through 11, there is provided an insulator bracket 112 which is generally similar to the bracket 12 described above and differs from the latter bracket principally in that the head of its mounting bolt and the bolt restraining means on its upper clevis arm are of somewhat different construction. As shown in Fig. 9, the bracket 112 includes an upper clevis arm 120 concaved upwardly to define a depression or channel 121 and this arm is provided with an opening 126 for accommodating the stem 124a of the mounting bolt 124. A portion of the upper clevis arm along its center line and adjacent the opening 126 is cut thereby to define a pair of slits 127 and 129 which respectively extend longitudinally of the clevis arm and away from the opening 126 for a short distance. A portion 128 of the clevis arm on the left side of the slit 127, as viewed in Fig. 9, is deformed upwardly to provide a vertical surface 128a (see Fig. 10), which cooperates with the clevis arm channel to define a bolt engaging corner 130. In a similar manner, a portion 131 of the clevis arm on the right side of the slit 129 is gradually deformed upwardly to provide a vertical surface 131a (see Fig. 9), which cooperates with the clevis arm 120 to define a bolt engaging corner 132.

The mounting bolt 124 has a generally T-shaped configuration and includes a relatively narrow head 133 located at one end of a stem 124a, the lower end of which is externally threaded as indicated at 124b. The head 133 is thinner but larger than the diameter of the stem 124a and, hence, includes a pair of lips or detents 125 extending outwardly beyond the stem 124a. Each lip or detent includes a vertical arm engaging surface 125a and a horizontal undersurface 125b which is adapted to engage the upper surface of the channel 121 and the upper surface of the upwardly inclined projections 128 and 131.

To effect assembly of the spool 123, bolt 124 and clevis 120, the mounting bolt 124 is inserted through the over-sized opening 126 and through the central opening in the spool 123 so that its threaded end 124b is received within the tapped opening 134 defined in the lower clevis arm 122. Thereafter, assembly of the bracket 112 is completed simply by turning the bolt 124. More particularly, after the bolt has been rotated several revolutions, the lips 125 engage the upper surface of the projections 128 with the result that the clevis arms 120 and 122 are deflected and are moved together. The clevis arms 120 and 122 are progressively moved closer together as the lips 125 move over increasingly elevated points on the projections 128 and then are quickly returned to their original positions as the lips move past and the projections or portions 128 to the bottom of the channel 121. After the bolt 124 has been rotated several revolutions so that the clevis arms 120 and 122 are slightly deflected when the lips 125 are seated on the bottom of the depression, the bolt is so positioned that the undersurfaces 125b of the head 133 lie on the bottom of the channel generally along the center line of the clevis arm 120 and the arm engaging surfaces 125a of the lips 125 are seated against the corners 130 and 132. In this position, the resilient force of the clevis arms 120 and 122 prevents the lips 125 from being inadvertently moved over the vertical surfaces 128a incident to counterclockwise movement of the bolt resulting from turning of the spool about its axis.

In contrast to the first embodiment, a wrench cannot be used to disassemble the insulator bracket because the upraised projections obstruct the counterclockwise movement of the bolt 124. Accordingly, it is necessary to employ a suitable tool for moving the clevis arms 120 and 122 toward one another until the upraised projections 128 and 131 are displaced beneath the under surfaces 125a of the lips 125. With clearance provided between the projections 128 and 131 and the detents 125, the mounting bolt 124 is manually rotated in a counterclockwise direction to withdraw it from the opening 134.

While the present invention has been described in connection with the details of particular embodiments thereof, it should be understood that these details are not intended to be limitative of the invention except insofar as set forth in the accompanying claims.

Having thus described the invention, what is claimed as new and desired to be secured by United States Letters Patent is:

1. An insulator bracket construction comprising a bracket having first and second supporting arms, said first supporting arm including means defining an opening therein and restraining means having a camming surface, said second supporting arm including means defining a threaded opening, an insulator spool having an opening therein, and a spool supporting bolt having a head structure adapted to be engaged by said restraining means and further having a threaded stem portion, said bolt extending through said opening in said first supporting arm and through the opening in the spool and having its threaded stem portion received within the threaded opening of said second supporting arm, said arms being relatively movable toward one another to develop a force for causing said restraining means to restrain said head structure from unintentional movement, said head structure coacting with the camming surface of said restraining means incident to intentional rotation of the bolt relative to said bracket to effect disengagement of said head structure and said restraining means.

2. A bracket construction comprising a bracket having spaced first and second supporting arms at least one of which is capable of being deflected slightly to develop a resilient force acting in a direction to oppose deflection, and a bolt carried by said arms, said bolt having a threaded stem portion and a head provided with a detent, said first supporting arm having means defining an opening for loosely accommodating said stem and further having restraining means for engaging said detent, said second arm having means defining a threaded opening for receiving said threaded stem portion, said bolt being disposed through said openings and cooperating with said first supporting arm to move said first and second supporting arms together by deflecting said one arm and thereafter to seat said detent against said restraining means, the resilient force developed by deflection of said one arm being effective to prevent inadvertent turning of the bolt, said bolt head and the restraining means being so configured that the bolt may be rotated while its head is in engagement with said restraining means.

3. A bracket construction comprising a bracket having first and second supporting arms, said first supporting arm including means defining a recess including a camming portion and said second supporting arm including means defining a threaded opening, and a bolt having a head portion adapted to seat in said recess in said first arm and a threaded stem for threadedly engaging said threaded opening in said second arm, at least one of said arms being capable of being deflected towards the other arm in order to permit said bolt head to be unseated from said recess, said one arm, when deflected, developing a force acting to maintain said bolt head portion seated in said recess in order to prevent said bolt from being rotated inadvertently, said head structure coacting with said camming portion during intentional rotation of said bolt to effect the disengagement of said bolt and said recess means.

4. The bracket construction defined by claim 1 wherein the restraining means comprises at least one projection extending outwardly from said first supporting arm and the head structure of the bolt includes a portion engageable with said projection to prevent said bolt from being turned out of said threaded opening, said projection being so configured that intentional rotation of said bolt is permitted in one direction only.

5. The bracket construction defined by claim 2 wherein the restraining means comprises a recess defined adjacent the opening in said first supporting arm and wherein the detent is shaped to conform to the shape of said recess so that said detent may be seated within the recess to inhibit the bolt from being turned out of said threaded opening.

6. The bracket construction defined by claim 2 wherein the restraining means comprises at least one projection extending outwardly adjacent the opening in said first supporting arm, said projection having an inclined portion over which said head portion rides during rotation of the bolt and a vertical surface portion against which the head portion abuts and wherein said detent comprises a portion on the head of the bolt engageable with the projection to prevent the bolt from being turned out of the threaded opening.

7. The bracket construction defined by claim 3 wherein the camming portion includes inclined side walls of the recess and wherein the head portion of the bolt is shaped to conform to the recess and has wall portions which ride upon the inclined side walls of the recess when the bolt is turned, thereby to permit movement of the head portion out of the recess in order to permit disassembly of the bracket construction.

8. The structure defined by claim 3 wherein the first supporting arm is curved concave outwardly and wherein the head portion of the bolt is dimensioned to engage the curved arm in order to move the arms toward each other when the bolt is turned during assembly of the bracket.

References Cited in the file of this patent

UNITED STATES PATENTS

| 1,577,193 | Reed | Mar. 16, 1926 |
| 1,802,965 | Brady | Apr. 28, 1931 |
| 2,650,263 | Steinmayer | Aug. 25, 1953 |

FOREIGN PATENTS

| 1,070 | Great Britain | 1910 |